(12) United States Patent
Ishinabe et al.

(10) Patent No.: US 11,275,154 B2
(45) Date of Patent: Mar. 15, 2022

(54) METHOD OF CORRECTING MEASUREMENT VALUE OF LASER SCANNER, AND DEVICE FOR THE METHOD

(71) Applicant: TOPCON CORPORATION, Tokyo (JP)

(72) Inventors: Ikuo Ishinabe, Tokyo (JP); Taichi Yuasa, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 843 days.

(21) Appl. No.: 16/122,054

(22) Filed: Sep. 5, 2018

(65) Prior Publication Data

US 2019/0094341 A1     Mar. 28, 2019

(30) Foreign Application Priority Data

Sep. 22, 2017 (JP) .............................. JP2017-182281

(51) Int. Cl.
  *G01S 17/89*     (2020.01)
  *G01S 7/497*     (2006.01)
  (Continued)

(52) U.S. Cl.
  CPC .......... *G01S 7/4808* (2013.01); *G01S 7/4814* (2013.01); *G01S 7/4817* (2013.01); *G01S 7/497* (2013.01); *G01S 17/08* (2013.01); *G01S 17/89* (2013.01)

(58) Field of Classification Search
  None
  See application file for complete search history.

(56) References Cited

U.S. PATENT DOCUMENTS

| 2007/0219437 A1* | 9/2007 | Schurman ............ A61B 5/0066 600/316 |
| 2009/0041070 A1* | 2/2009 | Yamagishi ........... H04N 9/3129 372/24 |

(Continued)

FOREIGN PATENT DOCUMENTS

JP     2016-151422 A     8/2016

OTHER PUBLICATIONS

Bravo-Medina et al., Error compensation in a pointing system based on Risley prisms, Mar. 7, 2017, Applied Optics, vol. 56, p. 2-7 (Year: 2017).*

*Primary Examiner* — Luke D Ratcliffe
*Assistant Examiner* — Benjamin Richard Hebert
(74) *Attorney, Agent, or Firm* — Roberts Calderon Safran & Cole P.C.

(57) ABSTRACT

A method of correcting a measurement value of a laser scanner includes: in a laser scanner including a light emitting unit, a light receiving unit, a distance measuring unit, an optical axis deflecting unit having at least a pair of prisms deflecting a distance measuring light and a reflected distance measuring light, and an emitting direction detecting unit detecting a deflection angle and an emitting direction of the distance measuring light from the optical axis deflecting unit, (a) measuring a distance to a measurement point, (b) detecting rotation angles of the prisms, and (c) obtaining, based on rotation angles of the prisms, a true distance measurement value corrected for a length of an optical path length difference in light emission and/or light reception caused according to the rotation angles of the prisms by subtracting the optical path length difference from a distance measurement value of the distance measuring unit.

5 Claims, 12 Drawing Sheets

(51) Int. Cl.
  *G01S 17/08* (2006.01)
  *G01S 7/48* (2006.01)
  *G01S 7/481* (2006.01)

(56) References Cited

U.S. PATENT DOCUMENTS

| | | | |
|---|---|---|---|
| 2010/0027089 A1* | 2/2010 | Nilsson | G01S 17/42 |
| | | | 359/201.1 |
| 2016/0238385 A1* | 8/2016 | Ohtomo | G01C 3/08 |
| 2019/0250274 A1* | 8/2019 | Ito | G01S 7/4972 |

* cited by examiner

FIG. 3

In light emission

| β1[°] | β2[°] | OPD [mm] |
|---|---|---|
| 0.000 | 0.000 | 0.0000000000000 |
| 0.000 | 5.000 | 0.0009267292354 |
| 0.000 | 10.000 | 0.0036990043525 |
| 0.000 | 15.000 | 0.0082931762312 |
| 0.000 | 20.000 | 0.0146701234422 |
| 0.000 | 25.000 | 0.0227756869457 |
| 0.000 | 30.000 | 0.0325412669672 |
| 0.000 | 35.000 | 0.0438845708370 |
| 0.000 | 40.000 | 0.0567104980447 |
| 0.000 | 45.000 | 0.0709121466681 |
| 0.000 | 50.000 | 0.0863719237475 |
| 0.000 | 55.000 | 0.1029627411023 |
| 0.000 | 60.000 | 0.1205492775371 |
| 0.000 | 65.000 | 0.1389892883345 |
| 0.000 | 70.000 | 0.1581349433463 |
| 0.000 | 75.000 | 0.1778341758163 |
| 0.000 | 80.000 | 0.1979320252456 |
| 0.000 | 85.000 | 0.2182719590655 |
| 0.000 | 90.000 | 0.2386971595528 |
| 0.000 | 95.000 | 0.2590517642374 |
| 0.000 | 100.000 | 0.2791820499421 |
| 0.000 | 105.000 | 0.2989375525062 |
| 0.000 | 110.000 | 0.3181721161162 |
| 0.000 | 115.000 | 0.3367448679570 |
| 0.000 | 120.000 | 0.3545211155608 |
| 0.000 | 125.000 | 0.3713731657377 |
| 0.000 | 130.000 | 0.3871810652996 |
| 0.000 | 135.000 | 0.4018332649105 |
| 0.000 | 145.000 | 0.4272698498833 |
| 0.000 | 150.000 | 0.4378781039229 |
| 0.000 | 155.000 | 0.4469792294259 |
| 0.000 | 160.000 | 0.4545111540651 |
| 0.000 | 165.000 | 0.4604227410895 |
| 0.000 | 170.000 | 0.4646740025276 |
| 0.000 | 175.000 | 0.4672362616816 |
| 0.000 | 180.000 | 0.4680922673620 |
| 0.000 | 185.000 | 0.4672362616816 |
| 0.000 | 190.000 | 0.4646740025276 |
| 0.000 | 195.000 | 0.4604227410895 |
| 0.000 | 200.000 | 0.4545111540651 |
| 0.000 | 205.000 | 0.4469792294259 |
| 0.000 | 210.000 | 0.4378781039229 |

FIG. 7

In light reception

| β1[°] | β2[°] | ΔOP [mm] |
|---|---|---|
| 0.00000 | 0.00000 | 0.0000000000 |
| 0.00000 | 5.00000 | 0.0039992401 |
| 0.00000 | 10.00000 | 0.0321719798 |
| 0.00000 | 15.00000 | 0.0246422346 |
| 0.00000 | 20.00000 | 0.0094280679 |
| 0.00000 | 25.00000 | -0.0124991966 |
| 0.00000 | 30.00000 | -0.0472246509 |
| 0.00000 | 35.00000 | -0.0819680195 |
| 0.00000 | 40.00000 | -0.1335758204 |
| 0.00000 | 45.00000 | -0.1745428212 |
| 0.00000 | 50.00000 | -0.2322339572 |
| 0.00000 | 55.00000 | -0.2901300486 |
| 0.00000 | 60.00000 | -0.3542136889 |
| 0.00000 | 65.00000 | -0.4187249422 |
| 0.00000 | 70.00000 | -0.4844040645 |
| 0.00000 | 75.00000 | -0.5594376894 |
| 0.00000 | 80.00000 | -0.6235890233 |
| 0.00000 | 85.00000 | -0.6845961622 |
| 0.00000 | 90.00000 | -0.7871291317 |
| 0.00000 | 95.00000 | -0.8244053102 |
| 0.00000 | 100.00000 | -0.8986850566 |
| 0.00000 | 105.00000 | -0.9635010450 |
| 0.00000 | 110.00000 | -1.0107998011 |
| 0.00000 | 115.00000 | -1.0760441108 |
| 0.00000 | 120.00000 | -1.1289236978 |
| 0.00000 | 125.00000 | -1.1750201169 |
| 0.00000 | 130.00000 | -1.2219310643 |
| 0.00000 | 135.00000 | -1.2712434228 |
| 0.00000 | 140.00000 | -1.3160329858 |
| 0.00000 | 145.00000 | -1.3570986124 |
| 0.00000 | 150.00000 | -1.3851945844 |
| 0.00000 | 155.00000 | -1.4052961072 |
| 0.00000 | 160.00000 | -1.4600870655 |
| 0.00000 | 165.00000 | -1.4690950722 |
| 0.00000 | 170.00000 | -1.4989066897 |
| 0.00000 | 175.00000 | -1.5165731372 |
| 0.00000 | 180.00000 | -1.5315906022 |
| 0.00000 | 185.00000 | -1.5165731372 |
| 0.00000 | 190.00000 | -1.4989066897 |
| 0.00000 | 195.00000 | -1.4690950722 |
| 0.00000 | 200.00000 | -1.4600870655 |
| 0.00000 | 205.00000 | -1.4052961072 |
| 0.00000 | 210.00000 | -1.3851945844 |

METHOD OF CORRECTING MEASUREMENT VALUE OF LASER SCANNER, AND DEVICE FOR THE METHOD

TECHNICAL FIELD

The present invention relates to a method of correcting a measurement value of a laser scanner that is capable of deflecting a distance measuring light by using Risley prisms, and a device for the method.

BACKGROUND ART

As devices capable of measuring three-dimensional point group data of a survey site, laser scanners are known. Among laser scanners, one disclosed in Patent Literature 1 can deflect a distance measuring light in an arbitrary direction, and can perform various scanning.

In detail, the laser scanner disclosed in Patent Literature 1 includes a light emitting unit configured to emit a distance measuring light, a light receiving unit configured to receive a reflected distance measuring light, a distance measuring unit configured to perform a distance measurement based on an output of the light receiving unit, a first optical axis deflecting unit configured to deflect a distance measuring light from an emission optical axis, a second optical axis deflecting unit configured to deflect a reflected distance measuring light at the same rotation angle (deflection angle and direction) as that of the first optical axis deflecting unit and deflect the reflected distance measuring light onto a light receiving optical axis, and an emitting direction detecting unit configured to detect a rotation angle of the first optical axis deflecting unit and the second optical axis deflecting unit. For each of the first optical axis deflecting unit and the second optical axis deflecting unit, a pair of Risley prisms are used. The Risley prisms are rotatable independently of each other. By passing through Risley prisms on the light emitting unit side, a distance measuring light is deflected in an arbitrary direction. By passing through Risley prisms on the light receiving unit side, the optical axis of a reflected distance measuring light is returned onto a light receiving optical axis, and the reflected distance measuring light is received. Thereafter, the laser scanner measures a round-trip time of the distance measuring light based on a light receiving signal of the light receiving unit to calculate a distance to a measurement point. In addition, based on rotation angles of the respective Risley prisms detected by the emitting direction detecting unit and refractive indexes of the respective Risley prisms, angles to the measurement point are measured.

CITATION LIST

Patent Literature

[Patent Literature 1] Japanese Published Unexamined Patent Application No. 2016-151422

SUMMARY OF THE INVENTION

Technical Problem

However, in the laser scanner disclosed in Patent Literature 1, the following point has not been considered. FIG. 14 illustrate optical path differences according to rotation angles of a pair of Risley prisms R1 and R2 on the light emitting unit side. The solid lines in the figure show loci of light ray tracking. When the state illustrated in FIG. 14A is regarded as a state where rotation angles are 0 degrees (basic positions), respectively, FIG. 14B illustrates a state where the Risley prism R2 is rotated 180 degrees with respect to the Risley prism R1. The inventors found a problem in which an optical path length of a section from an incidence surface (S2) of the Risley prism R1 to an emission surface (S5) of the Risley prism R2 differed, in light emission, according to rotation angles of the Risley prisms R1 and R2.

Next, FIG. 15 illustrate optical path differences according to rotation angles of a pair of Risley prisms R3 and R4 on the light receiving unit side. Solid lines in the figure show loci of light ray tracking. When the state illustrated in FIG. 15A is regarded as a state where rotation angles are 0 degrees (basic positions), FIG. 15B illustrates a state where the Risley prism R4 is rotated 180 degrees with respect to the Risley prism R3. The inventors found a problem in which, for light reception, when a virtual plane (Sd) is set at a position at equal distances L in a principal ray direction from an emission surface of the Risley prism R4, an optical path length of a section from an incidence surface (S11) of the Risley prism R3 to the virtual plane (Sd) differed according to rotation angles of the Risley prisms R3 and R4.

The laser scanner calculates a distance measurement value based on a round-trip time of a distance measuring light, so that the problem in which an optical path length differs according to rotation angles of the Risley prisms may cause errors in distance measurement values.

An object of the present invention is to solve the above-described problem, and to provide a method of correcting an error caused by an optical path length difference and a device for the method in a laser scanner capable of deflecting a distance measuring light by using Risley prisms.

Solution to Problem

In order to solve the above-described problem, a method of correcting a measurement value of a laser scanner according to an aspect of the present invention includes, in a laser scanner including a light emitting unit configured to emit a distance measuring light, a light receiving unit configured to receive a reflected distance measuring light, a distance measuring unit configured to perform a distance measurement based on an output of the light receiving unit, an optical axis deflecting unit having at least a pair of prisms configured to deflect and emit the distance measuring light from an emission optical axis, and deflect the reflected distance measuring light onto a light receiving optical axis, and an emitting direction detecting unit configured to detect a deflection angle and an emitting direction of the distance measuring light from a rotation angle of the optical axis deflecting unit, (a) a step of measuring a distance to a measurement point by the distance measuring unit, (b) a step of detecting rotation angles of the prisms by the emitting direction detecting unit, and (c) a step of obtaining, based on rotation angles of the prisms, a true distance measurement value corrected for a length of an optical path length difference in light emission and/or light reception occurring according to the rotation angles of the prisms by subtracting the optical path length difference from a distance measurement value of the distance measuring unit.

In the aspect described above, in Step (c) described above, it is also preferable that, regarding the optical path length difference in light emission, a light ray from an incidence surface of a prism at a front side in a light ray direction of the prisms to an emission surface of a prism at a back side in the light ray direction is traced while changing the rotation angles of the prisms, a difference between an optical path length when the prisms are at basic positions and an optical path length when the prisms are at arbitrary rotation angles is calculated, and optical path length differences are obtained as a correction table or correction parameters by function fitting, in advance.

In the aspect described above, in Step (c) described above, it is also preferable that, regarding the optical path length difference in light reception, a plurality of light rays from an incidence surface of a prism on a front side in a light ray direction of the prisms to a virtual plane are traced while changing the rotation angles of the prisms, a difference between an average optical path length of the plurality of light rays when the prisms are at basic positions and an average optical path length of the plurality of light rays when the prisms are at arbitrary rotation angles is calculated, and average optical path length differences are obtained as a correction table or correction parameters by function fitting, in advance.

In order to solve the above-described problem, a laser scanner according to an aspect of the present invention includes a light emitting unit configured to emit a distance measuring light, a light receiving unit configured to receive a reflected distance measuring light, a distance measuring unit configured to perform a distance measurement based on an output of the light receiving unit, an optical axis deflecting unit having at least a pair of prisms configured to deflect and emit the distance measuring light from an emission optical axis, and deflect the reflected distance measuring light onto a light receiving optical axis, an emitting direction detecting unit configured to detect a deflection angle and an emitting direction of the distance measuring light from a rotation angle of the optical axis deflecting unit, a distance measurement value correcting unit configured to correct a distance measurement value obtained by the distance measuring unit by an optical path length difference in light emission and/or light reception occurring according to rotation angles of the prisms, and a storage unit storing a correction table or correction parameters relating to the optical path length difference.

In the aspect described above, it is also preferable that, as the correction table or correction parameters, data in a range of an absolute value of an angle difference between the prisms from 0 degrees to 180 degrees are stored.

In the aspect described above, it is also preferable that the optical axis deflecting unit includes a plurality of the prisms respectively formed in the vertical direction.

In the aspect described above, it is also preferable that the optical axis deflecting unit includes a plurality of pairs of the prisms on the emission optical axis and/or the light receiving optical axis.

Effect of the Invention

With the method of correcting a measurement value and the device for the method according to the present invention, in a laser scanner capable of deflecting a distance measuring light by using Risley prisms, a distance measurement value can be more accurately obtained.

BRIEF DESCRIPTION OF THE DRAWINGS

FIG. 3 illustrates an example of calculation results of optical path length differences on a light emitting unit side of the laser scanner according to the embodiment.

FIG. 7 illustrates an example of calculation results of optical path length differences on a light receiving unit side of the laser scanner according to the embodiment.

DESCRIPTION OF EMBODIMENTS

Next, preferred embodiments of the present invention are described with reference to the drawings.

First Embodiment

Figure 1:
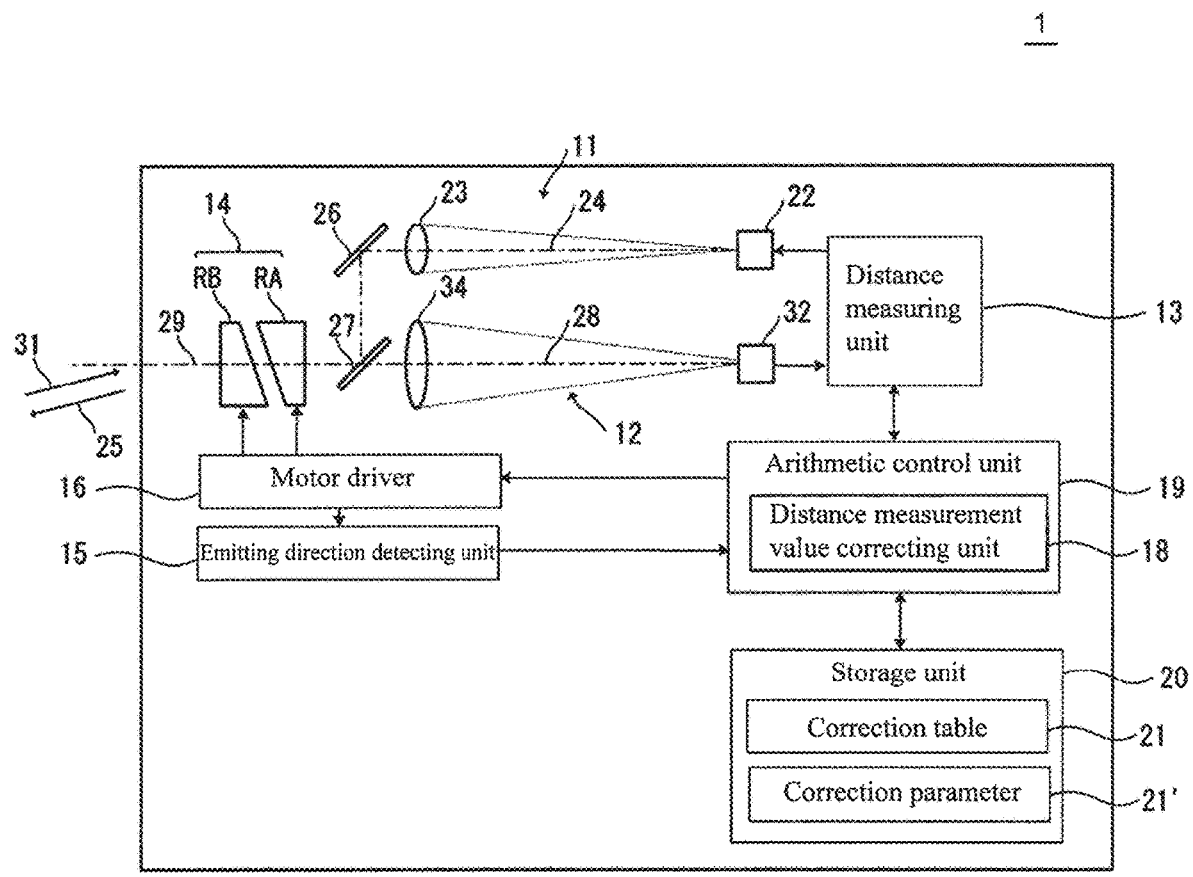
FIG. 1 is a configuration block diagram of a laser scanner according to an embodiment.

FIG. 1 is a configuration block diagram of a laser scanner (hereinafter, referred to as scanner 1) according to an embodiment.

The scanner 1 includes a light emitting unit 11, a light receiving unit 12, a distance measuring unit 13, an optical axis deflecting unit 14, an emitting direction detecting unit 15, a motor driver 16, an arithmetic control unit 19, and a storage unit 20. These are housed in a housing of the scanner 1.

The light emitting unit 11 includes a light emitting element 22 and a light projecting lens 23. The light emitting element 22 emits a pulsed laser light (hereinafter, referred to as a distance measuring light 25). The light emitting element 22 and the light projecting lens 23 are disposed on an emission optical axis 24. A first reflecting mirror 26 is disposed on the emission optical axis 24, and a second reflecting mirror 27 is disposed on a light receiving optical axis 28 described below. The emission optical axis 24 is configured so as to match the light receiving optical axis 28 by the first reflecting mirror 26 and the second reflecting mirror 27, and the distance measuring light 25 is emitted along a distance measuring optical axis 29 that is the same axis as the light receiving optical axis 28.

On the distance measuring optical axis 29, a pair of Risley prisms RA and RB that function as an optical axis deflecting unit 14 are disposed. The Risley prisms RA and RB are disposed so that an optical axis passing through the centers of the Risley prisms RA and RB is on the distance measuring optical axis 29 (that is, on the light receiving optical axis 28), and inclined surfaces of the prisms face each other. In the present embodiment, the Risley prism RA is disposed at a front side in a light ray direction of the distance measuring light 25, and the Risley prism RB is disposed at a back side in the light ray direction of the distance measuring light 25 (as viewed from a reflected distance measuring light 31, the Risley prism RB is disposed at a front side in a light ray direction of the reflected distance measuring light 31). The Risley prisms RA and RB can be rotated independently of each other by the motor driver 16. The distance measuring light 25 that has passed through the Risley prisms RA and RB is deflected from the distance measuring optical axis 29, and emitted. The reflected distance measuring light 31 that has passed through the Risley prisms RA and RB is deflected so as to match the light receiving optical axis 28, and is received.

The light receiving unit 12 includes an imaging lens 34 and a light receiving element 32. The imaging lens 34 and the light receiving element 32 are disposed on the light receiving optical axis 28. The light receiving element 32 is a photodiode or an avalanche photodiode, and receives the reflected distance measuring light 31 from a measurement point and outputs a light receiving signal.

The distance measuring unit 13 emits the distance measuring light 25 from the light emitting element 11, receives the reflected distance measuring light 31 from a measurement point by the light receiving unit 12, and based on a light receiving signal from the light receiving element 32, measures a round-trip time of the distance measuring light 25 to acquire a distance to the measurement point.

The emitting direction detecting unit 15 detects rotation angles (deflection angles and directions) of the Risley prisms RA and RB by counting drive pulses input to the motor driver 16 or by using an encoder. Then, the emitting direction detecting unit calculates a deflection angle and an emitting direction of the distance measuring light 25 from the rotation angles and refractive indexes of the Risley prisms RA and RB. The calculation results are input to the arithmetic control unit 19.

The arithmetic control unit 19 calculates a horizontal angle and a vertical angle to the measurement point from the deflection angle and emitting direction of the distance measuring light 25. Then, for each measurement point, the arithmetic control unit associates the horizontal angle and the vertical angle with a distance measurement value obtained by the distance measuring unit 13 to obtain three-dimensional point group data of measurement points. The arithmetic control unit 19 further includes a distance measurement value correcting unit 18. The distance measurement value correcting unit 18 is described below. Various programs for the arithmetic control described above are stored in the storage unit 20. The storage unit 20 stores a correction table 21 or correction parameters 21'. The correction table 21 and the correction parameters 21' are described below. The distance measuring unit 13, the emitting direction detecting unit 15, and the arithmetic control unit 19 are embodied by, for example, a microcontroller including a CPU, a ROM, and a RAM, etc., mounted on an integrated circuit. The storage unit 20 is embodied by, for example, a hard disk drive.

(Light Emitting Unit Side)

Figure 2:
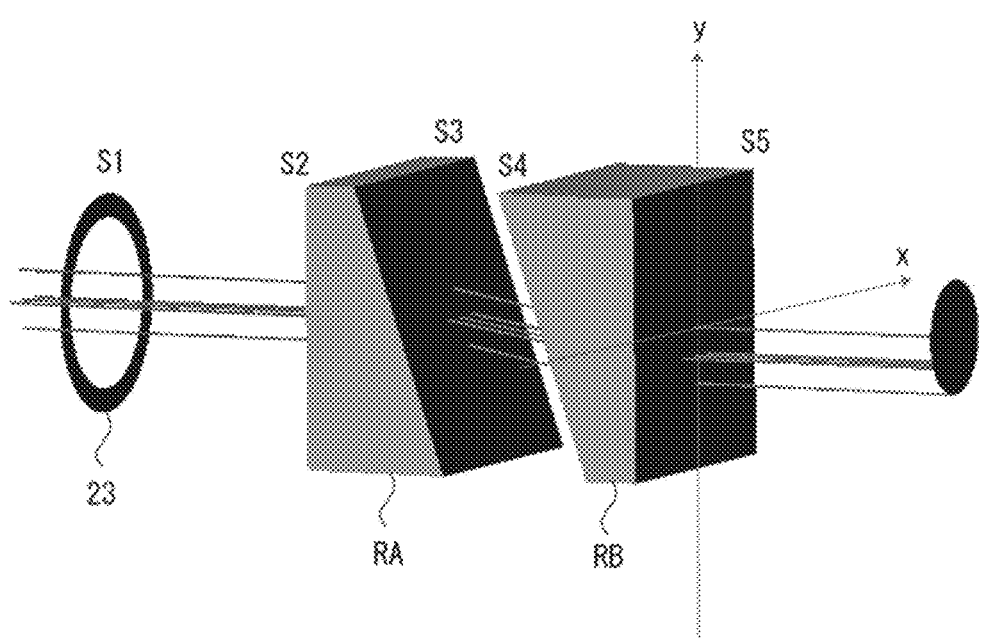
FIG. 2 illustrates a ray tracing model in light emission for the laser scanner according to the embodiment.
Figure 14A:
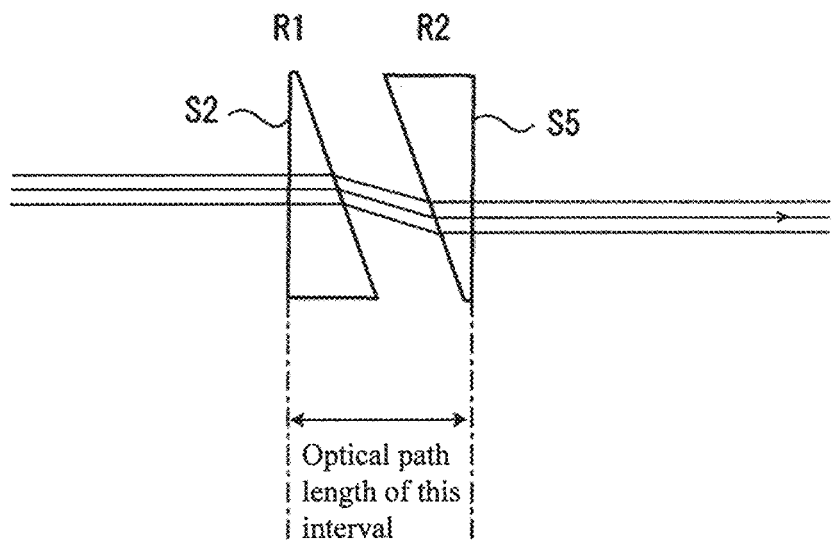
FIG. 14A illustrates optical path differences according to rotation angles of Risley prisms on a light emitting unit side in a state with rotation angles of 0°.
Figure 14B:
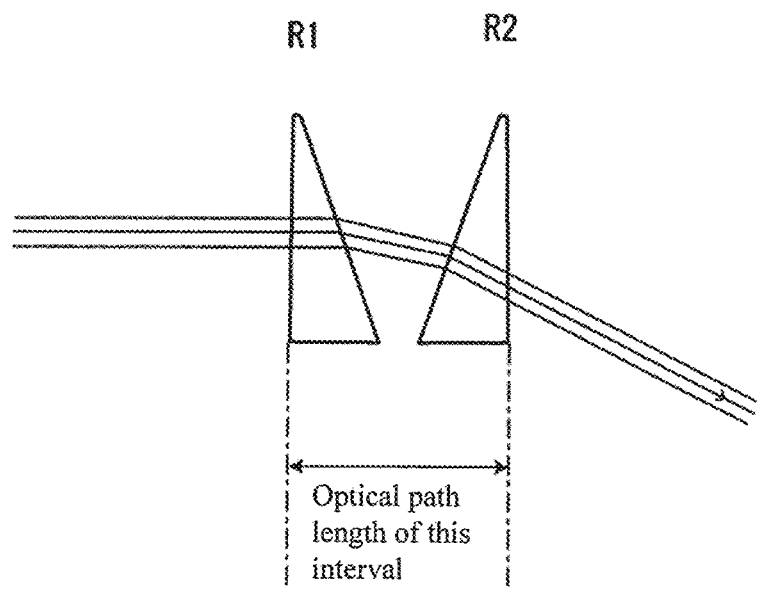
FIG. 14B illustrates optical path differences according to rotation angles of Risley prisms on a light emitting unit side with a rotation angle of 180°.

In the scanner 1 configured as described above, in order to solve the problem in which an optical path length differs according to rotation angles of the Risley prisms RA and RB in light emission (refer to FIG. 14), ray tracing is performed with an optical system model illustrated in FIG. 2. This model is an example of solution to the problem in which an optical path length differs in light emission, and may be altered based on knowledge of a person skilled in the art.

A surface S1 is an emission surface of the light projecting lens 23, a surface S2 is an incidence surface of the Risley prism RA, a surface S3 is an emission surface of the Risley prism RA, a surface S4 is an incidence surface of the Risley prism RB, and a surface S5 is an emission surface of the Risley prism RB. An intersection of the x- and y-axes of the model is set at the center of the surface S5, and the horizontal direction is defined as x, and the vertical direction is defined as y. The z-axis of the model is set in a light ray direction of the distance measuring light 25. Ray tracing is performed in this model, coordinate values and emitting direction cosines of a light ray on the prism final surface (S5) are calculated, and three-dimensional point group data are obtained from these and a slope distance measured by the distance measuring unit 13, and accordingly, three-dimensional point group data that the scanner 1 requires are obtained.

Ray tracing is performed from the surface (S1) to the surface (S5), and coordinate values (x5, y5, z5) and direction cosines (X5, Y5, Z5) of the light ray on the surface (S5) are obtained. Then, three-dimensional coordinates (x6, y6, z6) of a measurement point that the scanner 1 needs to obtain are obtained by Equation (1).

$$x6 = x5 + q5*X5$$

$$y6 = y5 + q5*Y5$$

$$z6 = z5 + q5*Z5 \tag{1}$$

Here, q5 is a distance measurement value (slope distance) measured by the distance measuring unit 13.

Ray tracing was performed in the following conditions by using the model described above. A rotation angle of the Risley prism RA was defined as $\beta1$, a rotation angle of the Risley prism RB was defined as $\beta2$, and the refractive indexes of the Risley prisms RA and RB were assumed to be 1.513740 on the assumption that BK7 glass was used. A state where there was no refraction after passing through the emission surface (S5) of the Risley prism RB was defined as basic positions (refer to FIG. 14A), at which $\beta1=0°$ and $\beta2=0°$. The Risley prism RA was fixed, the Risley prism RB was rotated in increments of 5°, and optical path length differences OPD of a section from the surface (S2) to the surface (S5) according to the rotation angles of the Risley prisms RA and RB on the light emitting unit 11 side were calculated.

Figure 4:
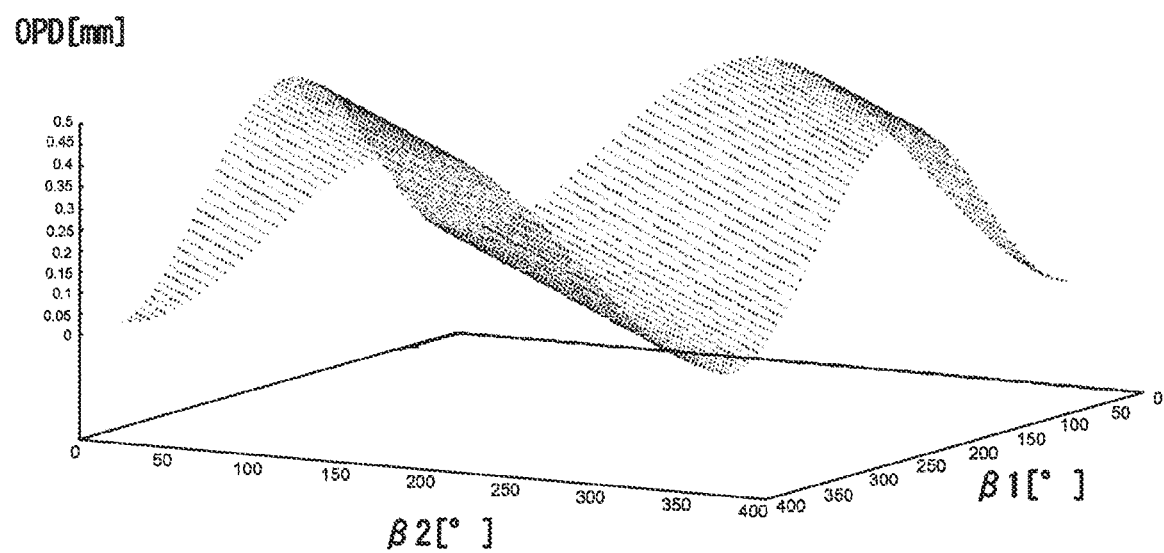
FIG. 4 illustrates a three-dimensional display of the calculation results of the optical path length differences in FIG. 3.

A part of the calculation results is shown in the table of FIG. 3. FIG. 4 is a three-dimensional display of $\beta1$, $\beta2$, and OPD by plotting the rotation angles $\beta1$ and $\beta2$ [°] on the x-y plane and plotting OPD [mm] on the z axis based on the calculation results. From FIG. 3 and FIG. 4, it was found that the optical path length difference OPD increased as the angle difference between β1 and β2 increased. It was also found that when the angle difference between β1 and β2 was ±180°, the optical path length difference OPD became longest.

From the results described above, a method of correcting an optical path length difference on the light emitting unit side is proposed.

A rotation angle of the Risley prism RA is defined as β1, a rotation angle of the Risley prism RB is defined as β2, and an optical path length difference of a section from the incidence surface (S2) of the Risley prism RA to the emission surface (S5) of the Risley prism RB is defined as $opd_{Emit}$ (β1, β2). When a slope distance measured by the distance measuring unit 13 is defined as q5 (β1, β2), a true distance measurement value (corrected slope distance) $q5_{proof,Emit}$ (β1, β2) corrected, at arbitrary β1 and β2, for an optical path length difference in light emission is obtained by Equation (2).

$$q5_{proof,Emit}(\beta1,\beta2)=q5(\beta1,\beta2)-\{opd_{Emit}(\beta1,\beta2)\} \quad (2)$$

The distance measurement value correcting unit 18 of the scanner 1 performs calculation of Equation (4), and by plugging in the obtained value of the corrected slope distance $q5_{proof,Emit}$ (β1, β2) for q5 in Equation (1), corrects the distance measurement value measured by the distance measuring unit 13.

Here, regarding the correction term $opd_{Emit}$ (β1, β2) of the optical path length difference, it is preferable that, for example, as illustrated in FIG. 3, optical path length differences OPD are obtained in advance according to refractive indexes of the prisms to be used, and the results are stored as a correction table 21 in the storage unit 20. Based on rotation angles 31 and 32 detected by the emitting direction detecting unit 15, the distance measurement value correcting unit 18 reads out a value of $opd_{Emit}$ (β1, β2) by referring to the correction table 21.

Alternatively, it is also preferable that, regarding the correction term $opd_{Emit}$ (β1, β2) of the optical path length difference, for example, as illustrated in FIG. 3, optical path length differences OPD are obtained in advance according to refractive indexes of the prisms to be used, and the results are subjected to function fitting, and obtained correction parameters 21' are stored in the storage unit 20. The distance measurement value correcting unit 18 calculates a value of $opd_{Emit}$ (β1, β2) by referring to a correction parameter 21' based on rotation angles β1 and β2 detected by the emitting direction detecting unit 15. It was confirmed that among the functions, by using a power series, a value of the correction term $opd_{Emit}$ (β1, β2) was preferably embodied.

(Light Receiving Unit Side)

Figure 15A:
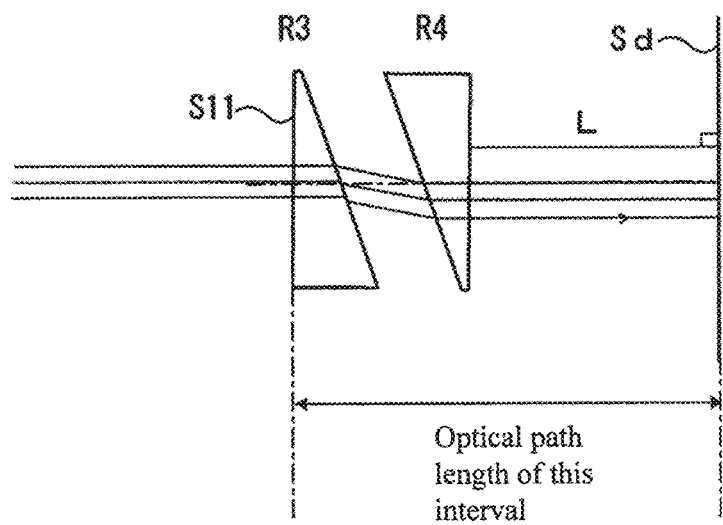
FIG. 15A is a diagram illustrating optical path differences according to rotation angles of Risley prisms on a light receiving unit side in a state with rotation angles of 0°.
Figure 15B:
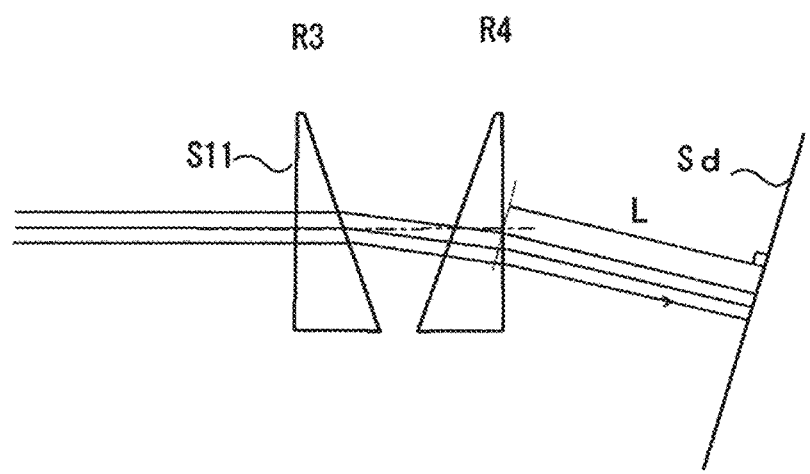
FIG. 15B is a diagram illustrating optical path differences according to rotation angles of Risley prisms on a light receiving unit side in a state with a rotation angle of 180°.

Next, in the scanner 1, a problem in which an optical path length differs according to rotation angles of the Risley prisms RA and RB in light reception (refer to FIG. 15) is solved. Because an optical path length difference calculated in a direction of light emission also acts in the same manner in light reception, ray tracing is performed from the light emission side to confirm an optical path length difference. In light reception, when a virtual plane (Sd) is set at a position at equal distances L in a principal ray direction from a prism final surface, according to rotation angles of the Risley prisms RA and RB, an optical path length from the incidence surface (S11) of the Risley prism RA to the virtual plane (Sd) variously changes, and a distance measurement is performed with an optical path length that differs each time.

Figure 5:
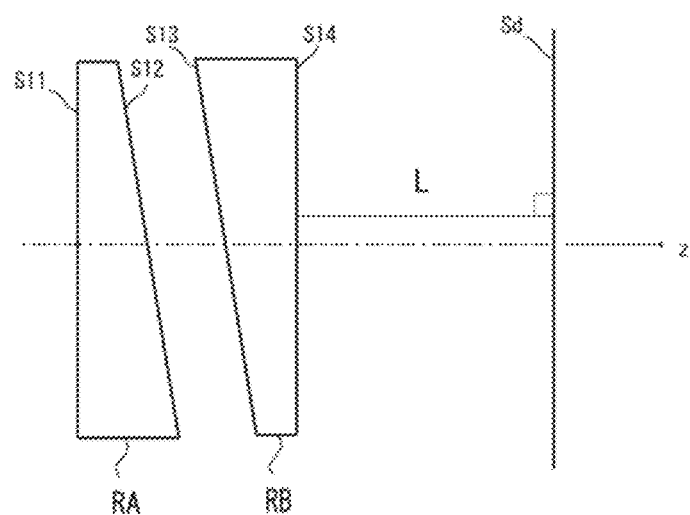
FIG. 5 illustrates a ray tracing model in light reception for the laser scanner according to the embodiment.

In order to solve the problem described above, ray tracing is performed with an optical system model illustrated in FIG. 5. This model is an example of solution to the problem in which the optical path length differs in light reception, and may be altered based on knowledge of a person skilled in the art.

A surface S11 is an incidence surface of the Risley prism RA, a surface S12 is an emission surface of the Risley prism RA, a surface S13 is an incidence surface of the Risley prism RB, and a surface S14 is an emission surface of the Risley prism RB. An intersection of the x- and y-axes of the model is set at the center of the surface S14, and the horizontal direction is defined as x, and the vertical direction is defined as y. The z-axis of the model is set in a light ray direction of the distance measuring light 25. A virtual plane (Sd) is set so that a principal light ray is made incident perpendicularly on the virtual plane (Sd).

Figure 6:
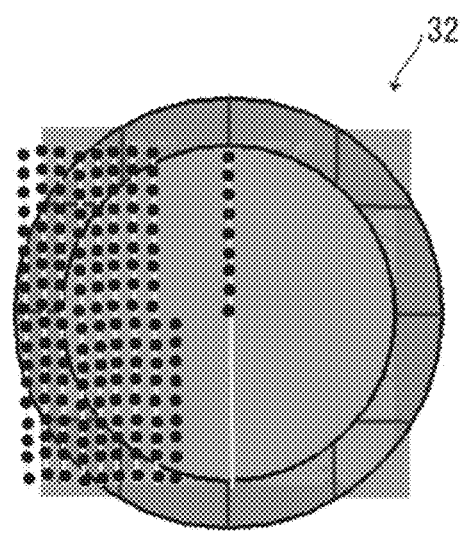
FIG. 6 illustrates an image of ray tracing in light reception for the laser scanner according to the embodiment.

Ray tracing was performed in the following conditions by using the model described above. A rotation angle of the Risley prism RA was defined as β1, a rotation angle of the Risley prism RB was defined as β2, and BK7 glass was used for the Risley prisms RA and RB. A state where there was no refraction after passing through the emission surface (S14) of the Risley prism RB was defined as basic positions (refer to FIG. 15A), at which β1=0° and β2=0°. After this setting, the Risley prism RA was fixed, and the Risley prism RB was rotated in increments of 50. At each rotation angle, the surface S11 was set as an entrance pupil, and a single light ray passing through the surface S11 is shifted in increments of a predetermined distance (for example, in steps of 1 mm) in the x and y directions to trace a plurality of light rays (FIG. 6 is an image of the ray tracing described above). Then, at each rotation angle, an average of results of ray tracing at the respective points from the incident surface (S11) of the Risley prism RA to the virtual plane (Sd) was calculated. Then, an average optical path length OP_00 at β1=0° and β2=0° was set as a reference, and a difference (average optical path length difference) between the average optical path length OP_00 and an average optical path length OP at arbitrary β1 and β2, that is, ΔOP=OP−OP_00 was calculated.

Figure 8:
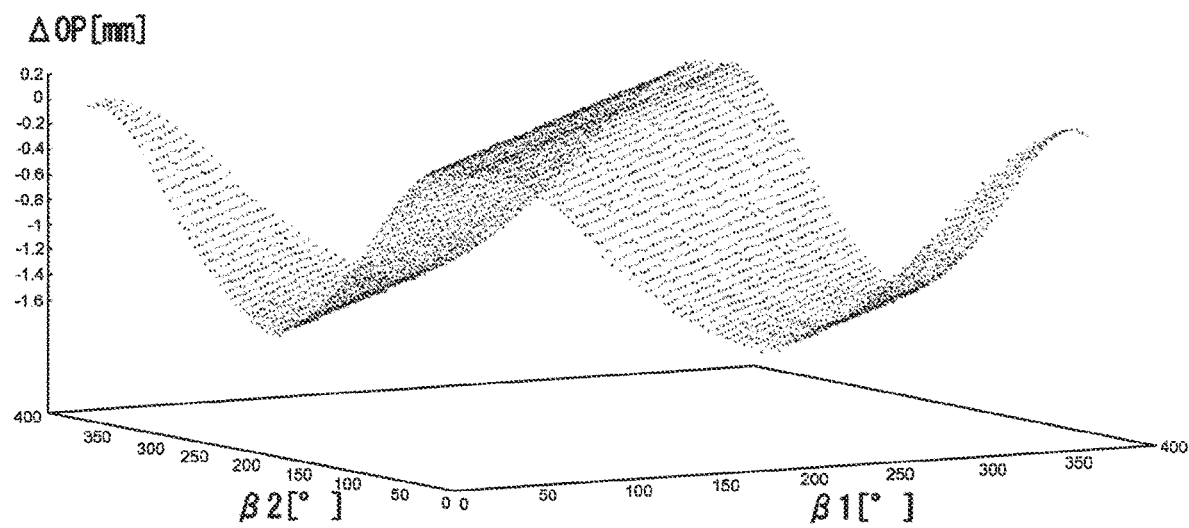
FIG. 8 illustrates a three-dimensional display of the calculation results of the optical path length differences in FIG. 7.

A part of the calculation results is shown in the table illustrated in FIG. 7. In FIG. 8, based on the calculation results, β1, β2, and ΔOP are three-dimensionally displayed by plotting the rotation angles β1 and β2 [°] on the x-y plane, and plotting an average optical path length difference ΔOP [mm] on the z-axis. From FIG. 7 and FIG. 8, it was found that the average optical path length difference ΔOP (absolute value) increased as the angle difference between β1 and β2 increased. It was also found that when the angle difference between β1 and β2 was ±180°, the average optical path length difference ΔOP (absolute value) became the longest.

Based on the results described above, a method of correcting an optical path length difference on the light receiving unit side is proposed.

A rotation angle of the Risley prism RA is defined as β1, a rotation angle of the Risley prism RB is defined as β2, and an average optical path length difference of a section from the incidence surface (S11) of the Risley prism RA to the virtual plane (Sd) is defined as $opd_{Recv}$(β1, β2). When a slope distance measured by the distance measuring unit 13 is defined as q5 (β1, β2), at arbitrary β1 and β2, a true distance measurement value (corrected slope distance) $q5_{proof,Recv}$(β1, β2) corrected for an optical path length difference in light reception is obtained by Equation (3).

$$q5_{proof,Recv}(\beta1,\beta2)=q5(\beta1,\beta2)-\{opd_{Recv}(\beta1,\beta2)\} \quad (3)$$

The distance measurement value correcting unit 18 of the scanner 1 performs calculation of Equation (3), and by plugging in the obtained value of the corrected slope distance $q5_{proof,Recv}$ (β1, β2) for q5 in Equation (1), corrects the distance measurement value measured by the distance measuring unit 13.

Here, as in the case of light emission, regarding the correction term $opd_{Recv}$ (β1, β2) of the optical path length difference as well, it is preferable that, for example, as illustrated in FIG. 7, average optical path length differences ΔOP are obtained in advance according to refractive indexes of prisms to be used, and the results are stored as a correction table 21 in the storage unit 20. Alternatively, it is also preferable that correction parameters 21' obtained through function fitting are stored in the storage unit 20. The distance measurement value correcting unit 18 obtains a value of $opd_{Recv}$(β1, β2) by referring to the correction table 21 or correction parameter 21' based on rotation angles β1 and β2 detected by the emitting direction detecting unit 15. It was confirmed that a value of the correction term $opd_{Recv}$(β1, β2) was also preferably embodied by using a power series.

(Method of Correcting Measurement Value)

In light of the correction methods on the light emitting unit 11 side and the light receiving unit 12 side, a method of correcting a measurement value of a laser scanner is proposed.

Figure 9:
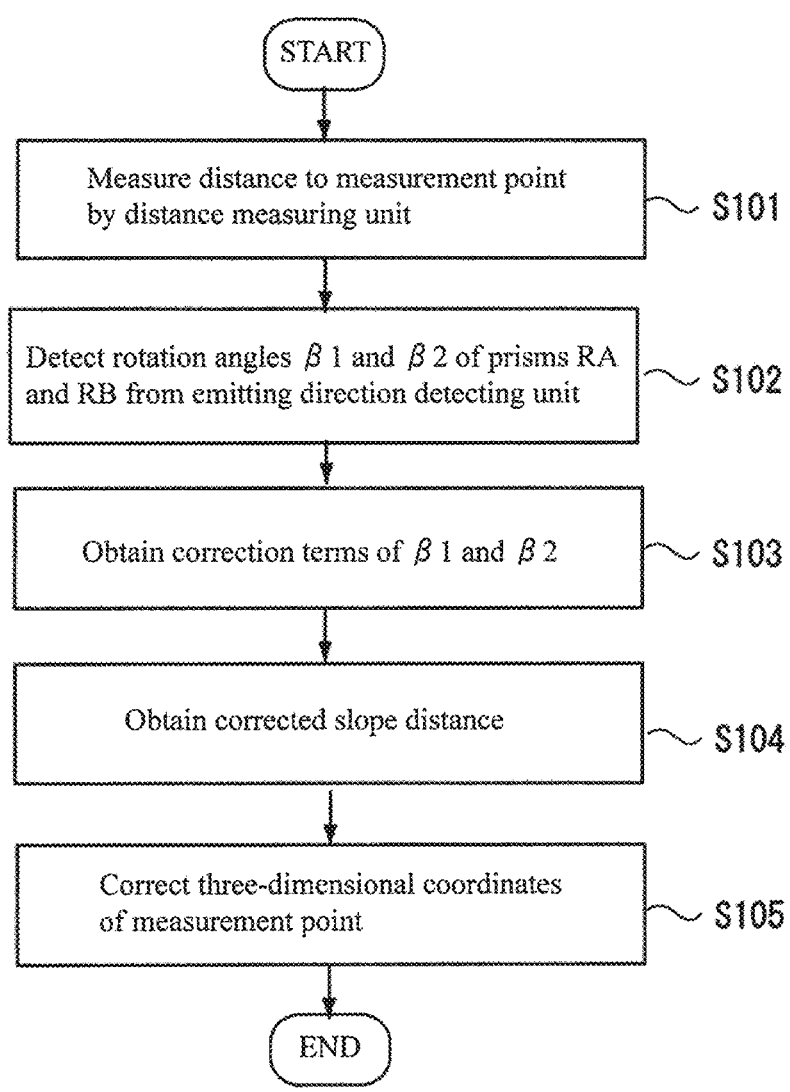
FIG. 9 is a preferred distance measurement value correction flowchart of the laser scanner according to the embodiment.

FIG. 9 is a correction flowchart of a distance measurement value of the scanner 1. In this flowchart, errors on both of the light emitting unit 11 side and the light receiving unit 12 side are corrected. As described above, Equation (2) is to correct a distance measurement value on the light emitting unit 11 side, and Equation (3) is to correct a distance measurement value on the light receiving unit 12 side. In consideration of these, a true distance measurement value (corrected slope distance) $q5_{proof}$ (β1, β2) corrected for both of an optical path length difference OPD in light emission and an optical path length difference ΔOP in light reception is obtained by Equation (4).

$$q5_{proof}(β1,β2)=q5(β1,β2)-\{opd_{Emit}(β1,β2)+opd_{Recv}(β1,β2)\} \quad (4)$$

Therefore, in the method of correcting a measurement value of the scanner 1, first, in Step S101, the distance measuring unit 13 scans a measurement point and measures a distance to the measurement point.

Next, in Step S102, the emitting direction detecting unit 15 detects rotation angles β1 and β2 of the Risley prisms RA and RB.

Next, in Step S103, the distance measurement value correcting unit 18 obtains values of the correction terms $opd_{Emit}$ (β1, β2) and $opd_{Recv}$ (β1, β2) by referring to the storage unit 20 based on the rotation angles β1 and β2.

Next, in Step S104, the distance measurement value correcting unit 18 obtains a corrected slope distance $q5_{proof}$ (β1, β2) from Equation (4).

Last, in Step S105, the distance measurement value correcting unit 18 corrects three-dimensional coordinates (x6, y6, z6) of the measurement point by plugging the value of the corrected slope distance $q5_{proof}$ (β1, β2) obtained in Step S104 into Equation (1).

(Effects)

As described above, with the scanner 1, a distance measurement value corrected for the optical path length difference OPD occurring on the light emitting unit 11 side and the optical path length difference ΔOP occurring on the light receiving unit 12 side is obtained, so that the measurement accuracy of three-dimensional point group data is improved.

By using Equation (2) in Step S104 described above, the correcting method eliminates an error caused by the optical path length difference OPD on the light emitting unit 11 side, and by using Equation (3) in Step S104 described above, the correcting method eliminates an error caused by the optical path length difference ΔOP on the light receiving unit 12 side. Even just by eliminating an error caused by an optical path length difference on either the light emitting unit 11 side or the light receiving unit 12 side, an effect of improvement in measurement accuracy is obtained.

It is preferable that, from the verification results illustrated in FIG. 4 and the verification results illustrated in FIG. 8, as the correction table 21 or the correction parameters 21' for the light emitting unit 11 and the light receiving unit 12, at least data in a range of an absolute value of an angle difference between β1 and β2 from 0° to 180° are held. Accordingly, the data storage capacity can be reduced.

(Modifications)

Modifications of the optical axis deflecting unit 14 of the embodiment described above are shown.

(Modification 1)

Figure 10:
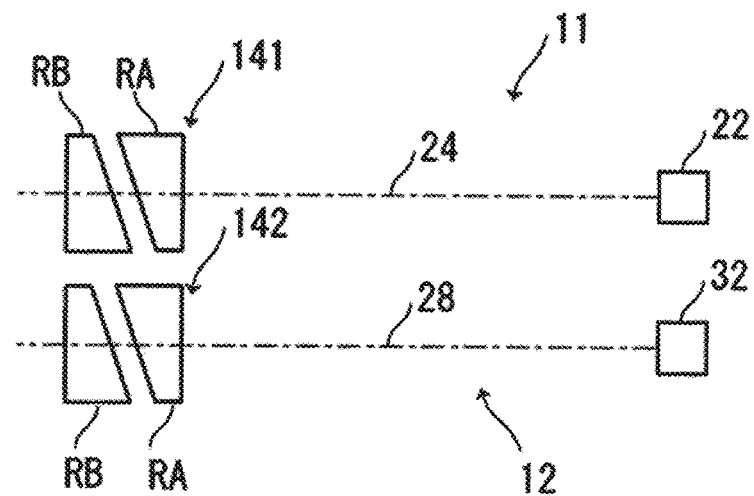
FIG. 10 illustrates Modification 1 of an optical axis deflecting unit of the laser scanner according to the embodiment.

In the embodiment described above, the optical axis deflecting unit 14 is shared by the light emitting unit 11 and the light receiving unit 12, however, as illustrated in FIG. 10, the optical axis deflecting unit 14 may be disposed on each of the light emitting unit 11 side and the light receiving unit 12 side. That is, it is also possible that a first optical axis deflecting unit 141 including at least a pair of prisms RA and RB is disposed on the emission optical axis 24, and a second optical axis deflecting unit 142 including at least a pair of prisms RA and RB is disposed on the light receiving optical axis 28.

(Modification 2)

Figure 11:
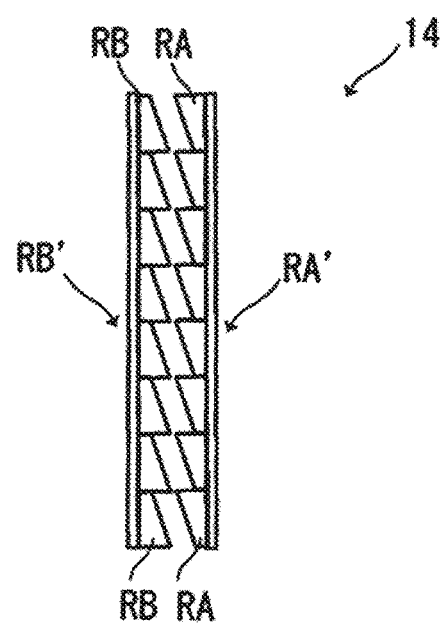
FIG. 11 illustrates Modification 2 of the optical axis deflecting unit of the laser scanner according to the embodiment.

In the embodiment described above, the optical axis deflecting unit 14 has a single prism RA and a single prism RB, however, as illustrated in FIG. 11, it is also possible that the optical axis deflecting unit 14 is formed of a first prism body RA' including a plurality of Risley prisms RA successively formed in the vertical direction, and a second prism body RB' including a plurality of Risley prisms RB successively formed in the vertical direction.

(Modification 3)

Figure 12:
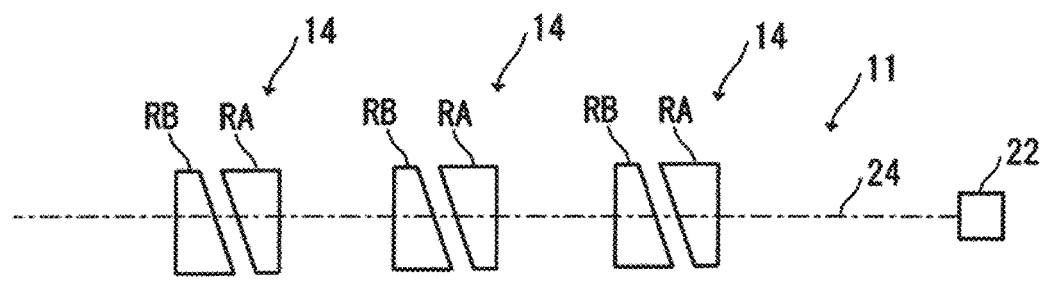
FIG. 12 illustrates Modification 3 of the optical axis deflecting unit of the laser scanner according to the embodiment.

In the embodiment described above, the optical axis deflecting unit 14 has a pair of prisms RA and RB, however, as illustrated in FIG. 12, it is also possible that the optical axis deflecting unit 14 includes a plurality of pairs of prisms RA and RB disposed on the emission optical axis 24 (in the embodiment, the distance measuring optical axis 29). In the case where the optical axis deflecting unit 14 is disposed on each of the light emitting unit 11 side and the light receiving unit 12 side as in FIG. 12, a plurality of pairs of prisms RA and RB may be disposed on the light receiving optical axis 28 as well.

(Modification 4)

Figure 13:
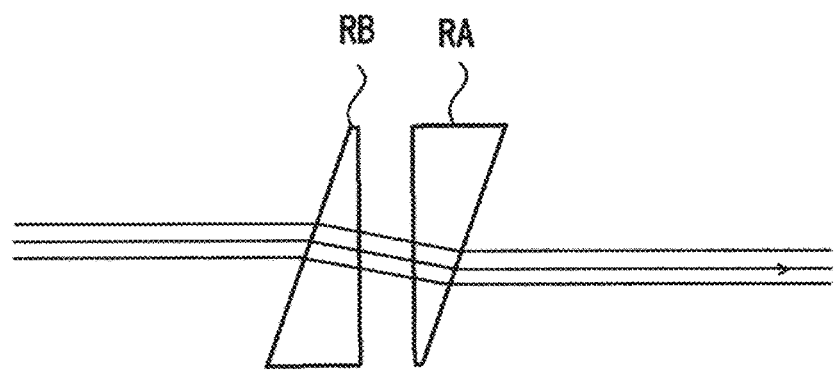
FIG. 13 illustrates Modification 4 of the optical axis deflecting unit of the laser scanner according to the embodiment.

In the embodiment described above, the Risley prisms RA and RB of the optical axis deflecting unit 14 are disposed so that their inclined surfaces face each other, however, as illustrated in FIG. 13, the Risley prisms may be disposed so that their vertical surfaces face each other.

While embodiments and modifications of a preferred method of correcting a measurement value and a device for the method according to the present invention are described above, the respective embodiments and the respective modifications can be combined based on knowledge of a person skilled in the art, and such combination modes are also included in the scope of the present invention.

REFERENCE SIGNS LIST

1 Laser scanner
11 Light emitting unit

12 Light receiving unit
13 Distance measuring unit
14 Optical axis deflecting unit
15 Emitting direction detecting unit
16 Motor driver
18 Distance measurement value correcting unit
19 Arithmetic control unit
20 Storage unit
21 Correction table
21' Correction parameter
24 Emission optical axis
25 Distance measuring light
28 Light receiving optical axis
29 Distance measuring optical axis
31 Reflected distance measuring light
RA, RB Risley prism

What is claimed is:

1. A method of correcting a measurement value of a laser scanner, comprising:
in a laser scanner including
a light emitting unit configured to emit a distance measuring light,
a light receiving unit configured to receive a reflected distance measuring light,
a distance measuring unit configured to perform a distance measurement based on an output of the light receiving unit,
an optical axis deflecting unit having at least a pair of prisms configured to deflect and emit the distance measuring light from an emission optical axis, and deflect the reflected distance measuring light onto a light receiving optical axis, and
a microcontroller including an emitting direction detecting unit configured to detect a deflection angle and an emitting direction of the distance measuring light from a rotation angle of the optical axis deflecting unit,
(a) a step of measuring a distance to a measurement point by the distance measuring unit;
(b) a step of detecting rotation angles of the prisms by the emitting direction detecting unit; and
(c) a step of obtaining, based on rotation angles of the prisms, a true distance measurement value corrected for a length of an optical path length difference in light emission and/or light reception occurring according to the rotation angles of the prisms by subtracting the optical path length difference from a distance measurement value of the distance measuring unit, wherein
in Step (c) described above,
regarding the optical path length difference in light emission,
a light ray from an incidence surface of a prism at a front side in a light ray direction of the prisms to an emission surface of a prism at a back side in the light ray direction is traced while changing the rotation angles of the prisms, a difference between an optical path length when the prisms are at basic positions and an optical path length when the prisms are at arbitrary rotation angles is calculated, and optical path length differences are obtained as a correction table or correction parameters by function fitting, in advance, and
regarding the optical path length difference in light reception,
a virtual plane is selected so that a principal light ray is made incident perpendicularly on the virtual plane, a plurality of light rays from an incidence surface of a prism on a front side in a light ray direction of the prisms to the virtual plane are traced while changing the rotation angles of the prisms, a difference between an average optical path length of the plurality of light rays when the prisms are at basic positions and an average optical path length of the plurality of light rays when the prisms are at arbitrary rotation angles is calculated, and average optical path length differences are obtained as a correction table or correction parameters by function fitting, in advance.

2. A laser scanner comprising:
a light emitting unit configured to emit a distance measuring light;
a light receiving unit configured to receive a reflected distance measuring light;
a distance measuring unit configured to perform a distance measurement based on an output of the light receiving unit;
an optical axis deflecting unit having at least a pair of prisms configured to deflect and emit the distance measuring light from an emission optical axis, and deflect the reflected distance measuring light onto a light receiving optical axis;
a microcontroller including; an emitting direction detecting unit configured to detect a deflection angle and an emitting direction of the distance measuring light from a rotation angle of the optical axis deflecting unit; and a distance measurement value correcting unit configured to correct a distance measurement value obtained by the distance measuring unit by an optical path length difference in light emission and/or light reception occurring according to rotation angles of the prisms; and
a storage unit storing a correction table or correction parameters relating to the optical path length difference, wherein
in the distance measurement value correcting unit,
regarding the optical path length difference in light emission, a light ray from an incidence surface of a prism at a front side in a light ray direction of the prisms to an emission surface of a prism at a back side in the light ray direction is traced while changing the rotation angles of the prisms, a difference between an optical path length when the prisms are at basic positions and an optical path length when the prisms are at arbitrary rotation angles is calculated, and optical path length differences are obtained as a correction table or correction parameters by function fitting, in advance,
regarding the optical path length difference in light reception, a virtual plane is selected so that a principal light ray is made incident perpendicularly on the virtual plane, a plurality of light rays from an incidence surface of a prism on a front side in a light ray direction of the prisms to the virtual plane are traced while changing the rotation angles of the prisms, a difference between an average optical path length of the plurality of light rays when the prisms are at basic positions and an average optical path length of the plurality of light rays when the prisms are at arbitrary rotation angles is calculated, and average optical path length differences are obtained as a correction table or correction parameters by function fitting, in advance.

3. The laser scanner according to claim 2, wherein as the correction table or correction parameters, data in a range of an absolute value of an angle difference between the prisms from 0 degrees to 180 degrees are stored.

4. The laser scanner according to claim 2, wherein the optical axis deflecting unit includes a plurality of the prisms respectively formed in the vertical direction.

5. The laser scanner according to claim 2, wherein the optical axis deflecting unit includes a plurality of pairs of the prisms on the emission optical axis and/or the light receiving optical axis.

* * * * *